US012668519B2

(12) United States Patent
Murugesan et al.

(10) Patent No.: US 12,668,519 B2
(45) Date of Patent: Jun. 30, 2026

(54) METHOD TO TREAT AND MINIMIZE SLUDGE FROM BIOREFINERIES

(71) Applicant: Baker Hughes Oilfield Operations LLC, Houston, TX (US)

(72) Inventors: Sankaran Murugesan, Katy, TX (US); Jerry J. Weers, Richmond, TX (US); Sai Reddy Pinappu, Sugar Land, TX (US); Jeffery K. Bolton, Batton Rouge, LA (US); James E. Kiolbassa, Mansfield, TX (US); Rolando P. Perez, Cut Off, LA (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 313 days.

(21) Appl. No.: 18/374,529

(22) Filed: Sep. 28, 2023

(65) Prior Publication Data

US 2024/0109799 A1 Apr. 4, 2024

Related U.S. Application Data

(60) Provisional application No. 63/411,504, filed on Sep. 29, 2022.

(51) Int. Cl.
C02F 9/00 (2023.01)
C02F 1/24 (2023.01)
(Continued)

(52) U.S. Cl.
CPC ................. C02F 9/00 (2013.01); *C02F 1/26* (2013.01); *C02F 1/38* (2013.01); *C02F 1/683* (2013.01);
(Continued)

(58) Field of Classification Search
CPC ...... C02F 9/00; C02F 1/26; C02F 1/38; C02F 1/683; C02F 1/72; C02F 11/121;
(Continued)

(56) References Cited

U.S. PATENT DOCUMENTS 6,204,421 B1 * 3/2001 Genssler ................ C10G 9/005
208/50
7,497,943 B2 3/2009 Nguyen et al.
(Continued)

FOREIGN PATENT DOCUMENTS

CN 101602566 B 9/2012
CN 104150673 B 5/2016
(Continued)

OTHER PUBLICATIONS

Journal of Hazardous Materials 261 (2013) 470-490. (Year: 2013).*
(Continued)

*Primary Examiner* — Pranav N Patel
(74) *Attorney, Agent, or Firm* — Crowe & Dunlevy, P.C.

(57) ABSTRACT

It is a continuing goal to reduce the amount of sludge produced in a biorefinery while also improving oil quality and water quality. In one aspect, an exemplary method of minimizing sludge from biorefineries includes the steps of feeding a source feedstock into a degumming centrifuge, where the source feedstock is separated into wet oil and a primary sludge stream, and conveying a portion of the primary sludge stream to a three-phase centrifuge. At the three-phase centrifuge, the portion of the primary sludge stream is separated into recovered centrifuge oil, which is retrieved; centrifuged water, which is conveyed to a waste-water treatment plant; and centrifuged sludge. The remainder of the primary sludge stream is conveyed to a gravity separator, where the remainder of the primary sludge stream
(Continued)

is separated into recovered oil and residual sludge. The residual oil is retrieved from the gravity separator.

20 Claims, 17 Drawing Sheets

(51) Int. Cl.

| | |
|---|---|
| *C02F 1/38* | (2023.01) |
| *C02F 1/26* | (2023.01) |
| *C02F 1/68* | (2023.01) |
| *C02F 1/72* | (2023.01) |
| *C02F 11/121* | (2019.01) |
| *C02F 11/14* | (2019.01) |
| *C02F 101/32* | (2006.01) |
| *C02F 103/36* | (2006.01) |

(52) U.S. Cl.
CPC .............. *C02F 1/72* (2013.01); *C02F 11/121* (2013.01); *C02F 11/14* (2013.01); *C02F 2101/325* (2013.01); *C02F 2103/36* (2013.01)

(58) Field of Classification Search
CPC ................ C02F 11/14; C02F 2101/325; C02F 2103/36; C02F 1/24; C02F 1/283; C02F 1/722; C02F 1/727; C02F 1/76; C02F 11/127; C02F 11/13; C02F 2303/26; C02F 2305/04
See application file for complete search history.

(56) References Cited

U.S. PATENT DOCUMENTS

| | | |
|---|---|---|
| 9,212,075 B2 | 12/2015 | Zhong et al. |
| 2011/0100878 A1 | 5/2011 | Massetti et al. |
| 2011/0253634 A1 | 10/2011 | Soane et al. |
| 2016/0340605 A1 | 11/2016 | Guay et al. |
| 2021/0332244 A1 | 10/2021 | Mccurdy et al. |
| 2022/0033731 A1 | 2/2022 | Abhari et al. |

FOREIGN PATENT DOCUMENTS

| | | |
|---|---|---|
| CN | 104341081 B | 8/2016 |
| CN | 105174657 B | 5/2017 |
| CN | 111606531 A | 9/2020 |
| CN | 114292661 A | 4/2022 |
| WO | 2010055997 A2 | 5/2010 |

OTHER PUBLICATIONS

"International Search Report and Written Opinion for PCT/US2023/034029 mailed Feb. 2, 2024".

Chew, Sook Chin, et al., "Optimization of degumming parameters in chemical refining process to reduce phosphorus contents in kenaf seed oil", Separation and Purification Technology 188 (2017), pp. 379-385.

Dos Passos, Rafaela Menezes, et al., "Phospholipase cocktail: A new degumming technique for crude soybean oil", Food Science and Technology 159 (2022) 113197, pp. 1-9.

Riberio, Ana Paula Badan, et al., "The optimization of soybean oil degumming on a pilot plant scale using a ceramic membrane", Journal of Food Engineering 87(4) (2008), pp. 514-521.

* cited by examiner

Water phase

Propylene carbonate phase

METHOD TO TREAT AND MINIMIZE SLUDGE FROM BIOREFINERIES

CROSS-REFERENCE TO RELATED APPLICATIONS

This application claims the benefit of U.S. Provisional Patent Application No. 63/411,504 filed Sep. 29, 2022, and incorporates said provisional application by reference into this document as if fully set out at this point.

TECHNICAL FIELD

The present invention relates to methods, systems, and compositions for treating and minimizing sludge in biorefineries, and more particularly relates to methods, systems, and compositions for treating and minimizing sludge in biorefineries that improves oil quality and water quality and reduces the amount of sludge produced.

BACKGROUND

Biorefineries are refineries that convert biomass to energy and other beneficial byproducts, such as chemicals. The International Energy Agency Bioenergy Task 42 defined biorefining as "the sustainable processing of biomass into a spectrum of bio-based products (food, feed, chemicals, materials) and bioenergy (biofuels, power, and/or heat)." Biomass, therefore, can be used as fuel to produce heat or electricity. As defined herein, biomass is the raw material for a biorefinery. Biomass includes, but is not necessarily limited to, plant-based material, animal waste, municipal waste, and certain pyrolysis oils.

Disposing of sludge (viscous semi-solids) from biorefineries is challenging, and in current processes, biorefinery sludge is primarily disposed in landfills. As is well-known, landfills are filling up and new landfills are difficult to develop. Thus, disposing of sludge in landfills is expensive. Further, sludge material can pose a fire hazard, especially when the sludge is dry, due to the exothermic oxidation of unsaturated hydrocarbon contaminates present in the sludge.

It is thus a continuing goal to reduce the amount of sludge produced in a biorefinery while also improving oil quality and water quality.

SUMMARY

In one aspect, a method for minimizing sludge from a biorefinery includes the step of feeding a source feedstock into a degumming centrifuge, where the source feedstock is separated into wet oil and a primary sludge stream, and the step of conveying the primary sludge stream to a gravity separator, where the primary sludge stream is separated into recovered oil and residual sludge. The recovered oil is retrieved, while the residual sludge is conveyed to a flotation system, where the residual sludge is separated into separated water and a waste product. The separated water is conveyed to a wastewater treatment plant, and the waste product is disposed of.

In another aspect, a method for minimizing sludge from a biorefinery includes the step of feeding a source feedstock into a degumming centrifuge, where the source feedstock is separated into wet oil and a primary sludge stream, and the step of conveying a portion of the primary sludge stream to a three-phase centrifuge. At the three-phase centrifuge, the portion of the primary sludge stream is separated into centrifuged oil, which is retrieved; centrifuged water, which is conveyed to a wastewater treatment plant; and centrifuged sludge. The remainder of the primary sludge stream is conveyed to a gravity separator, where the remainder of the primary sludge stream is separated into recovered oil, which is retrieved, and residual sludge.

In yet another aspect, a method for minimizing sludge from a biorefinery includes the steps of feeding a source feedstock into a degumming centrifuge, where the source feedstock is separated into wet oil and a primary sludge stream, and heating the primary sludge stream to a temperature ranging from about 100° F. to about 212° F. The primary sludge stream is conveyed to a three-phase centrifuge, where the primary sludge stream is separated into centrifuged oil, centrifuged water, and centrifuged sludge. The centrifuged oil is retrieved, the centrifuged water is conveyed to a wastewater treatment plant, and the centrifuged sludge is conveyed to a two-phase centrifuge, where the centrifuged sludge is separated into centrifuged wastewater and centrifuged waste. The centrifuged wastewater is conveyed to the wastewater treatment plant, and the centrifuged waste is disposed of.

DETAILED DESCRIPTION

A key step in biorefinery processing is to remove contaminants from biorefinery feedstocks or "degum" the oil. "Feedstocks" as used herein includes biomass.

Figure 1:
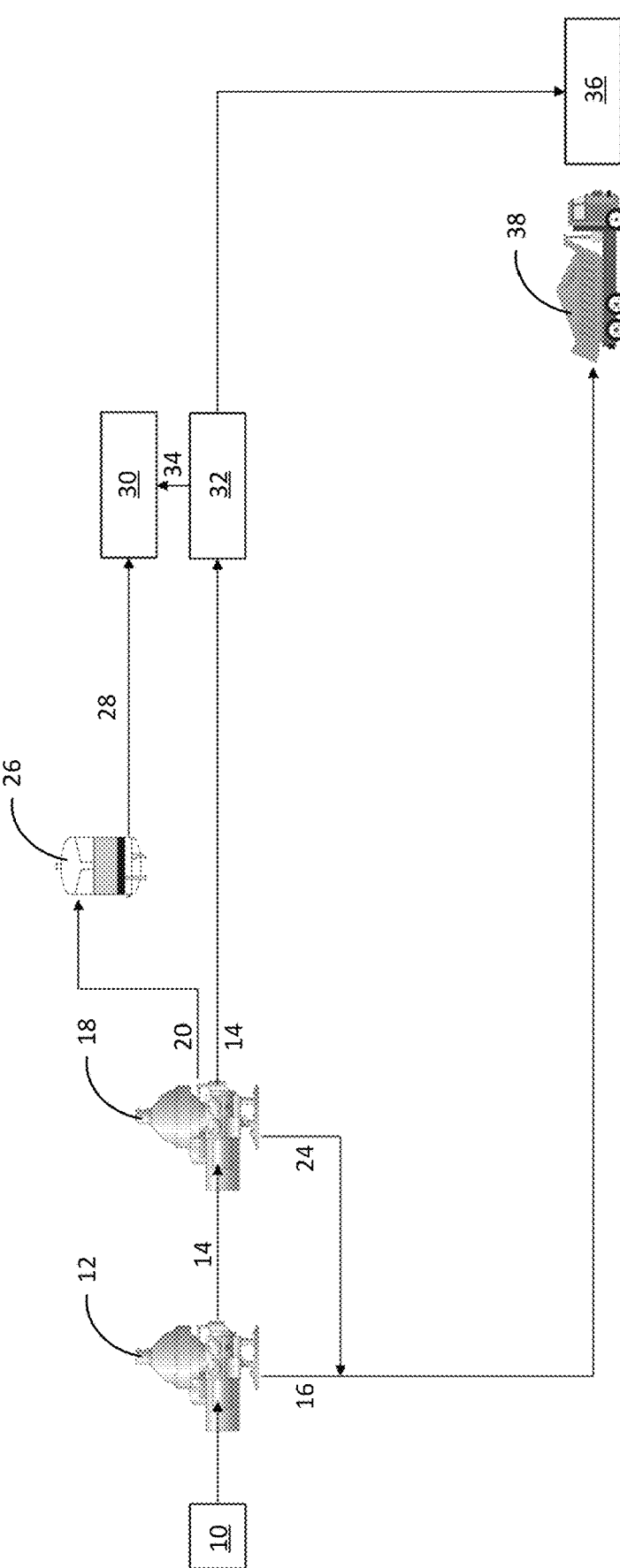
FIG. 1 is a schematic illustration of a conventional method for processing biorefinery sludge.
Figure 13:
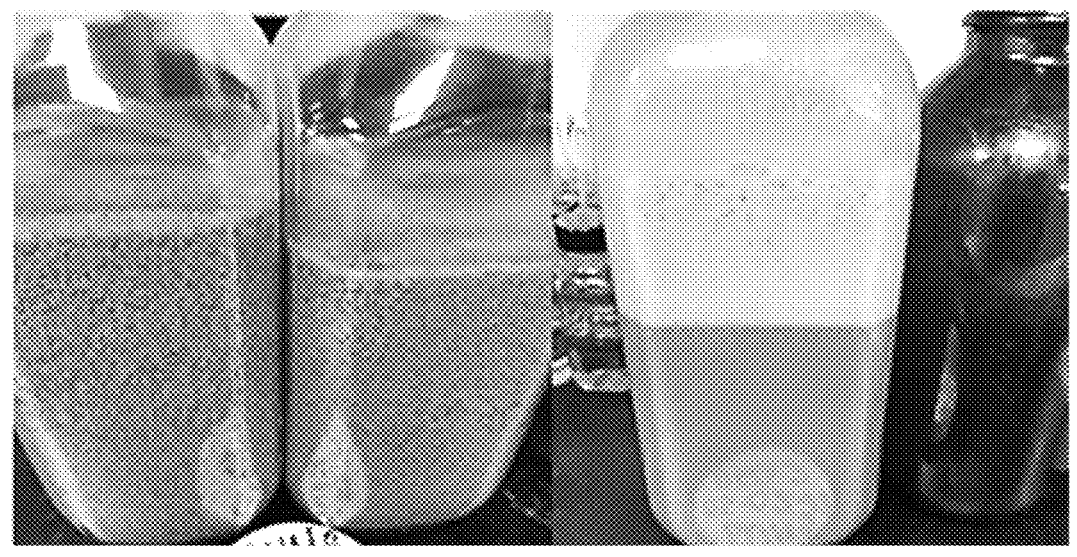
FIG. 13 depicts different semi-solid sludges from a biorefinery.
Figure 13:
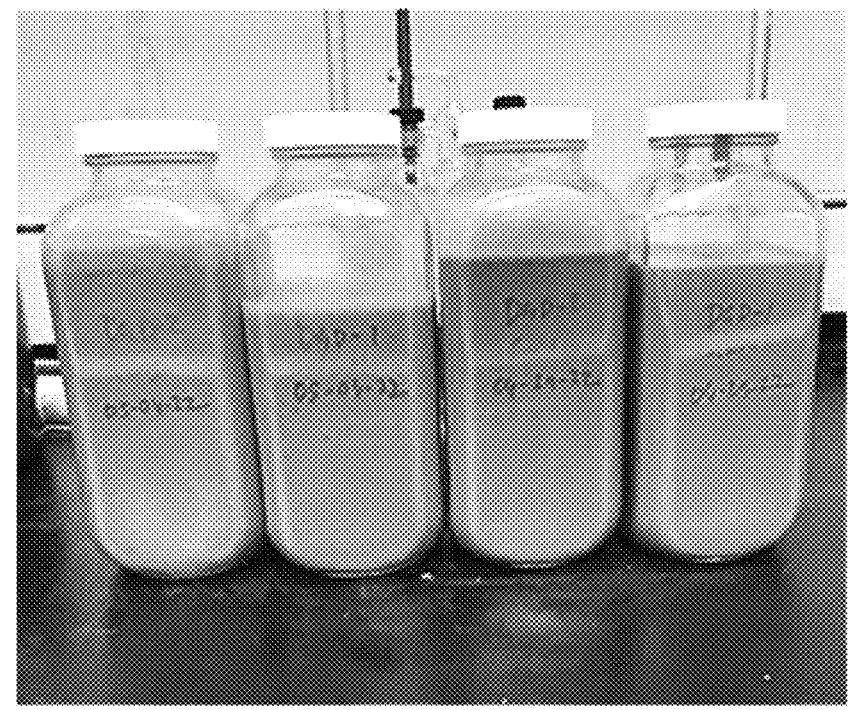

FIG. 1 is a schematic illustration of a conventional method of processing sludge from a biorefinery feedstock. Generally, in a first step, a feedstock 10 is fed into a degumming centrifuge 12, which separates the feedstock 10 into a wet oil phase 14 and a primary sludge stream 16. The wet oil phase 14 typically is conveyed to an oil/water separator 18 to separate the wet oil phase 14 into oil 20, water 22, and a second sludge stream 24 that is combined with the primary sludge stream 16. The oil 20 may be sent through a filter 26 to obtain a filtered oil 28 that is further processed at a downstream unit 30. The water 22 is sent through a second oil/water separator 32 to remove any remaining oil 34 before traveling to a wastewater treatment plant 36. The sludge streams 16, 24 are an emulsion that includes between about 5-50 vol. % oil and between about 1-15 vol. % solids, with a low pH water as the balance. By "low pH" is meant a pH of between about 1 to about 7. The emulsion is typically very stable due to relatively high concentrations of emulsifying components including, but not necessarily limited to, phospholipids, monoglycerides, diglycerides, and other surfactants in the oil. Due to the high stability of the emulsion, the sludge streams 16, 24 are typically sent to landfill disposal 38 at a high economic cost. FIG. 13 provides several photographs of untreated biorefinery sludges. While some separation can be seen due to gravity settling, these examples demonstrate the semi-solid nature of sludges.

The innovative methods and systems described herein can minimize the quantity of sludge produced from a biorefinery process through both mechanical and chemical separation. Reduction in the amount of sludge also decreases sludge disposal costs. Further, the innovative methods and systems can improve the quality of the materials produced by the biorefinery, such as bio diesel and oil. Oil and water can be retrieved and recycled, and the oil quality and water quality may be improved by the innovative methods and systems. For example, the hydrocarbon content (i.e., chemical oxygen demand) of water that is separated from the sludge may be reduced, leaving a smaller amount of solid waste to be landfilled. Recovering oil from sludge may also increase the overall yield of biorefinery produced oil and other materials.

A source feedstock 100 may include between about 3 vol. % to about 46 vol. % oil, between about 4 vol. % to about 10 vol. % emulsion, between about 42 vol. % to about 90 vol. % water, and between about 1 vol. % to about 10 vol. % sludge. In one embodiment, the source feedstock 100 is fed into a degumming centrifuge 102 which separates the source feedstock 100 into wet oil 104 and a primary sludge stream 106. After the wet oil 104 exits the degumming centrifuge 102, hot wash water 108 is added to the wet oil 104, which is then conveyed to a water wash centrifuge 110 and therein separated into degummed oil 112, oily water 114, and a second sludge stream 116. In one embodiment, the degummed oil 112 is sent through a filter 118 to obtain filtered oil 120. The filtered oil 120 is then conveyed to a downstream biorefining unit 122, such as a refiner or an "ecofiner", which makes biofuels and other biorefinery produced materials. The oily water 114 is conveyed to an oil/water separator 124, which separates the oily water 114 into an oil stream 126 and a wastewater stream 128. The wastewater stream 128 is conveyed to a wastewater treatment plant 130. In some instances, the oil stream 126 is conveyed to the downstream biorefining unit 122 for further refining. The second sludge stream 116, on the other hand, exits the water wash centrifuge 110 and is joined with the primary sludge stream 106. It will be appreciated that these streams, when referred to in combination as "the primary sludge stream and the second sludge stream" or as "the sludge streams", are a single combined flow.

In one non-limiting embodiment, the emulsions and gum waste of the sludge streams 106, 116 include between about 5 vol. % to about 50 vol. % oil and between about 1 vol. % to about 15 vol. % solids. In another non-limiting embodiment, the sludge streams 106, 116 include low pH water and about 70 vol. % water, about 15 vol. % oil, and less than about 15 vol. % gums/solids. High solids streams such as these sludges may be suitably conveyed using progressive cavity pumps designed to pump thick fluids and solids.

As depicted in FIG. 1, in traditional sludge disposal methods, the primary sludge stream 106 and the second sludge stream 116 are sent to the landfill disposal 38 without further treatment. However, direct disposal of the primary sludge stream 106 and the second sludge stream 116 does not occur in the improved methods and systems described herein; hence, the direct disposal pathway in FIGS. 2-12 is marked with the blocking symbol "0".

The sludge streams 106, 116 are conveyed to at least one separation unit to separate out various components of the sludge. The at least one separation unit may include a gravity separator, an enhanced separator, or both. Where multiple separation units are used, one or more of the products from one separation unit may be conveyed to another separation unit. The separation(s) may be carried out at a temperature between about 100° F. independently to about 212° F.; alternatively, at a temperature between about 152° F. independently to about 200° F.; and in another non-limiting embodiment, at a temperature greater than about 190° F. independently. As used herein with respect to a range, the term "independently" means that any endpoint may be used with any other endpoint to give a suitable alternative range. For instance, a suitable alternative range may be from about 190° F. to about 212° F. Most separations described herein occur at atmospheric pressure, but some pressure may develop due to high fluid temperatures. The higher pressures due to temperature do not generally influence the performance of the separation units.

Suitable gravity separators include, but are not necessarily limited to, corrugated plate interceptors, coalescing plates, storage tanks, and oil/water separators, such as an API oil/water separator. The storage tanks may be optionally equipped with skimmers.

The enhanced separators may be flotation systems, centrifuges, decanters, hydrocyclones, or filters. Suitable flotation systems may use one or more processes to separate suspended oils and solids from water. In various embodiments, the flotation systems use dissolved air flotation, dissolved gas flotation, dissolved nitrogen flotation, induced air flotation, and/or induced gas flotation. In one non-limiting embodiment, the centrifuges are disk centrifuges. Suitable filters include, but are not necessarily limited to, stack filter cartridges and column packed adsorption media, which may utilize materials such as carbon, clay, and resins.

Figure 2:
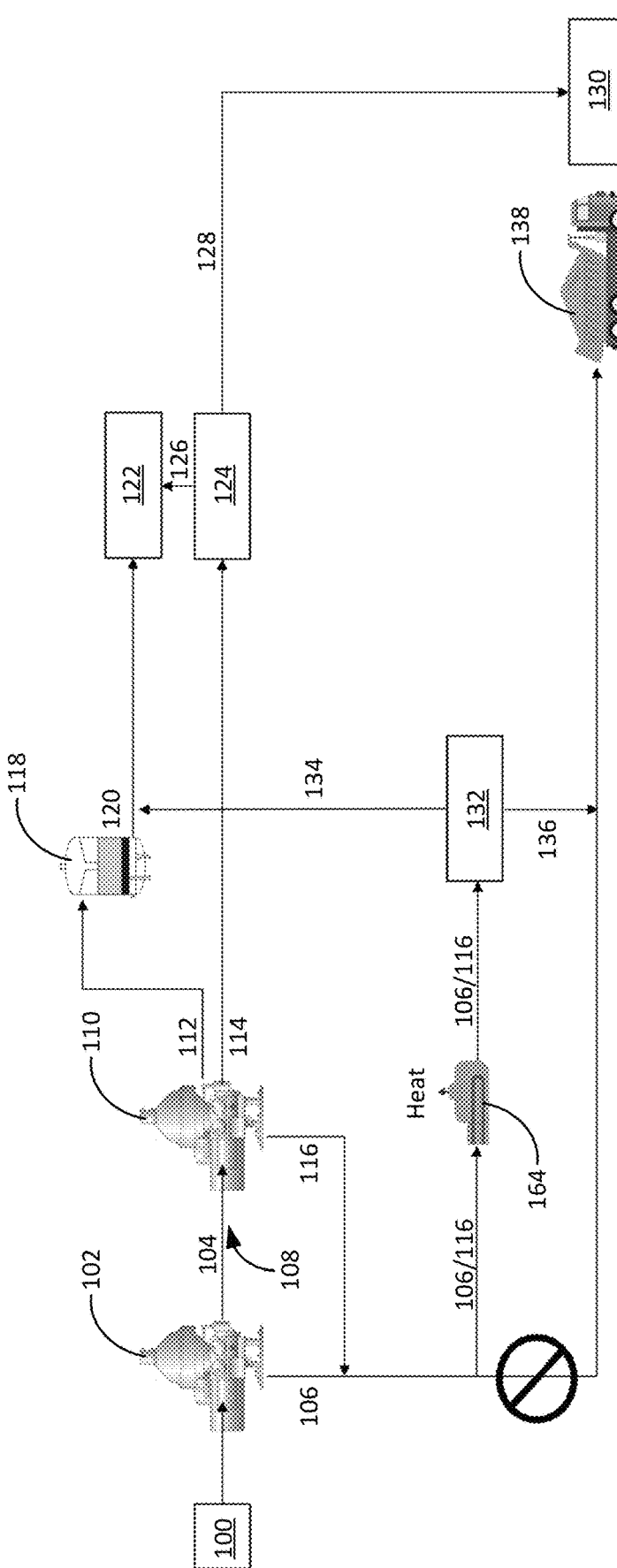
FIG. 2 is a schematic illustration of a method and system with a gravity separator in accordance with an illustrative embodiment of the present disclosure.

In one embodiment of the innovative methods and systems, as depicted in FIG. 2, the primary sludge stream 106 and the second sludge stream 116 are conveyed to a gravity separator 132, where the sludge streams 106, 116 are separated into recovered oil 134 and residual sludge 136. The recovered oil 134 may be retrieved from the gravity separator 132 and recycled; in one non-limiting embodiment, about 15 vol. % of oil in the sludge streams 106, 116 is recovered from the gravity separator 132. Upon retrieval, the recovered oil 134 may be conveyed, for example, to the downstream biorefining unit 122 for further refining. The residual sludge 136, on the other hand, is conveyed to the landfill 138 for disposal.

Figure 3:
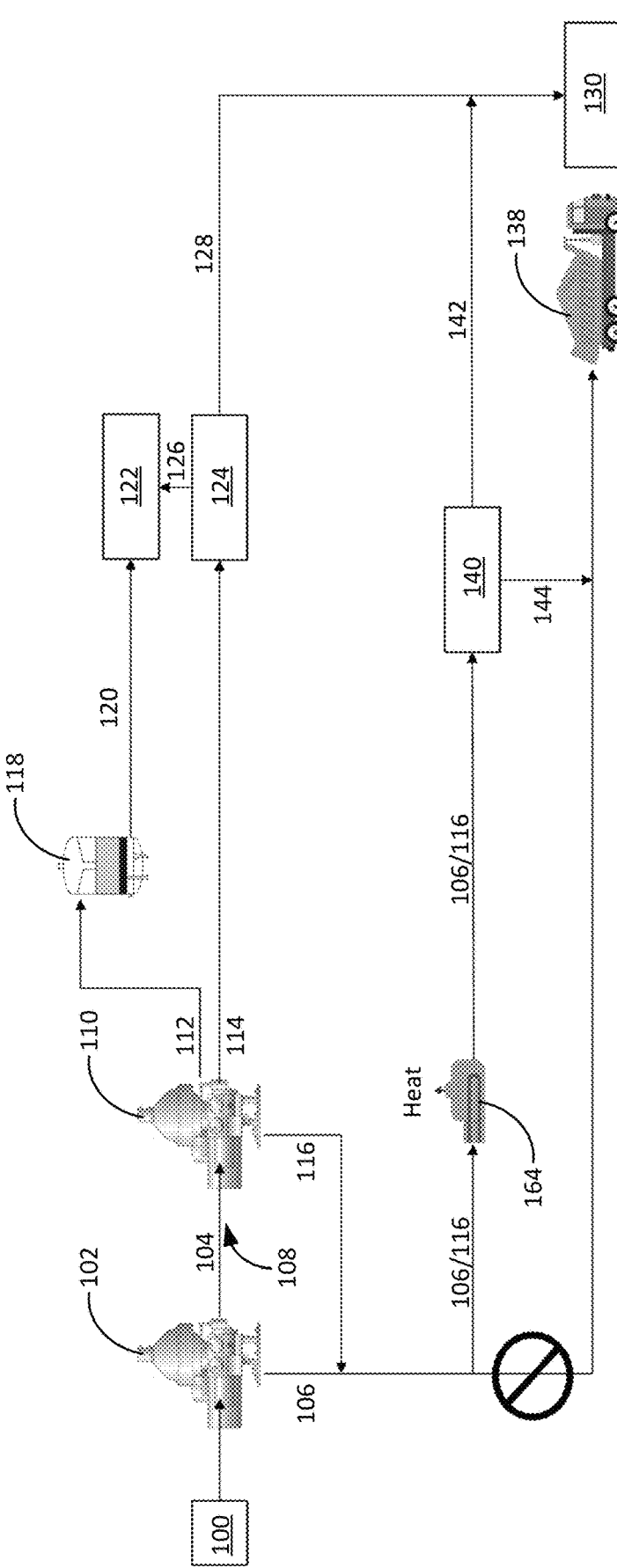
FIG. 3 is a schematic illustration of a method and system with a flotation system in accordance with an illustrative embodiment of the present disclosure.

In another embodiment, as depicted in FIG. 3, the primary sludge stream 106 and the second sludge stream 116 are conveyed to a flotation system 140, which separates the sludge streams 106, 116 into separated water 142 and a waste product 144. The separated water 142 is sent to the wastewater treatment plant 130, while the waste product 144 is disposed of at the landfill 138.

Figure 4:
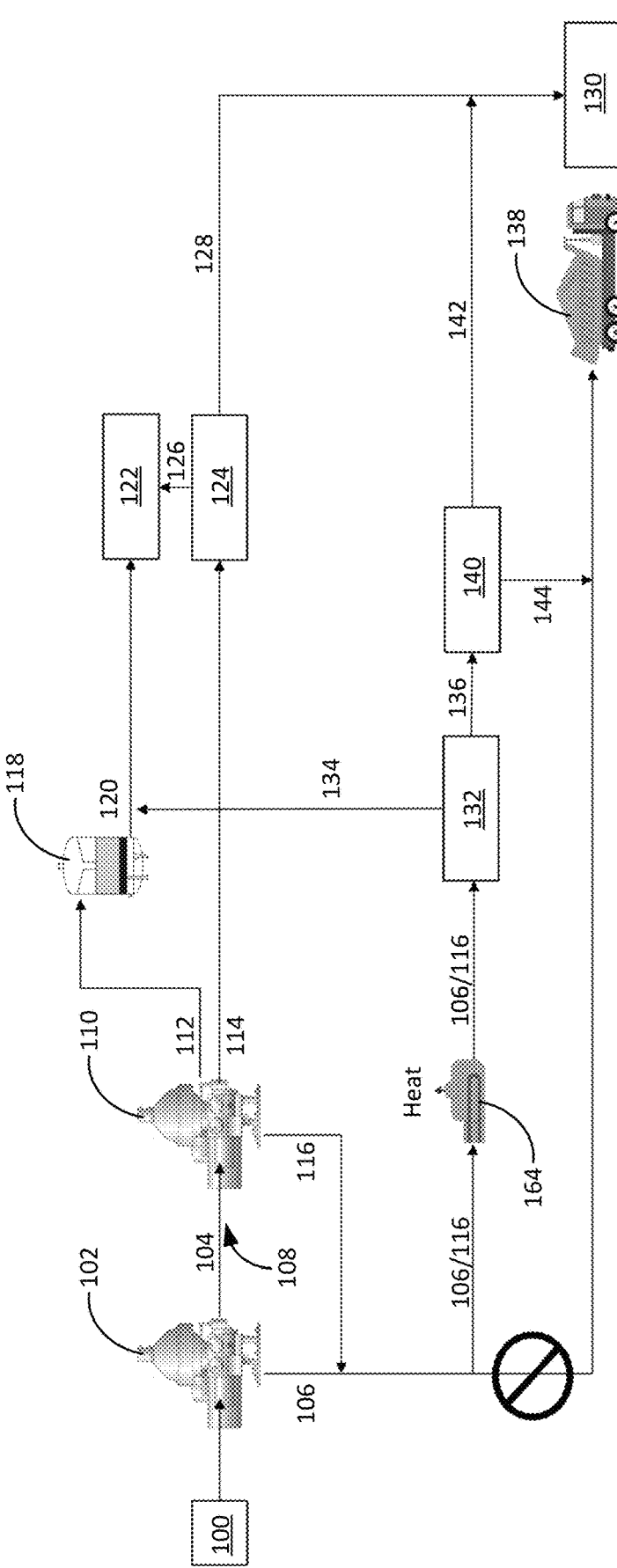
FIG. 4 is a schematic illustration of a method and system with a gravity separator and a flotation system in accordance with an illustrative embodiment of the present disclosure.

FIG. 4 depicts yet another embodiment, in which the gravity separator 132 and the flotation system 140 are used in sequence. For this embodiment, the primary sludge stream 106 and the second sludge stream 116 first enter the gravity separator 132 and are separated into the recovered oil 134 and the residual sludge 136. The recovered oil 134 may be retrieved and recycled, e.g., by conveying the recovered oil 134 to the downstream biorefining unit 122. The residual sludge 136 is conveyed to the flotation system 140, where the residual sludge 136 is then separated into separated water 142, which is sent to the wastewater treatment plant 130, and the waste product 144, which is sent to the landfill 138 for disposal.

Flotation aids may be added to the sludge streams 106, 116 or to the residual sludge 136 prior to entering the flotation system 140 to promote better separation therein. In various non-limiting embodiments, suitable flotation aids include combinations of inorganic coagulants (e.g., halides, oxides, and hydroxides of iron, aluminum, and zinc) with flocculants such as polyamines (e.g., a melamine/formaldehyde reaction product) or cationic polymers containing quaternary ammonium groups (e.g., epichlorohydrin/dimethylamine polymers and diallydimethylammonium chloride polymers) and polymers of monomers containing anionic sulfonate or carboxylate groups. The flotation aid may also be based on natural products such as modified starches, cellulose, tannins, or chitosan.

Figure 5:
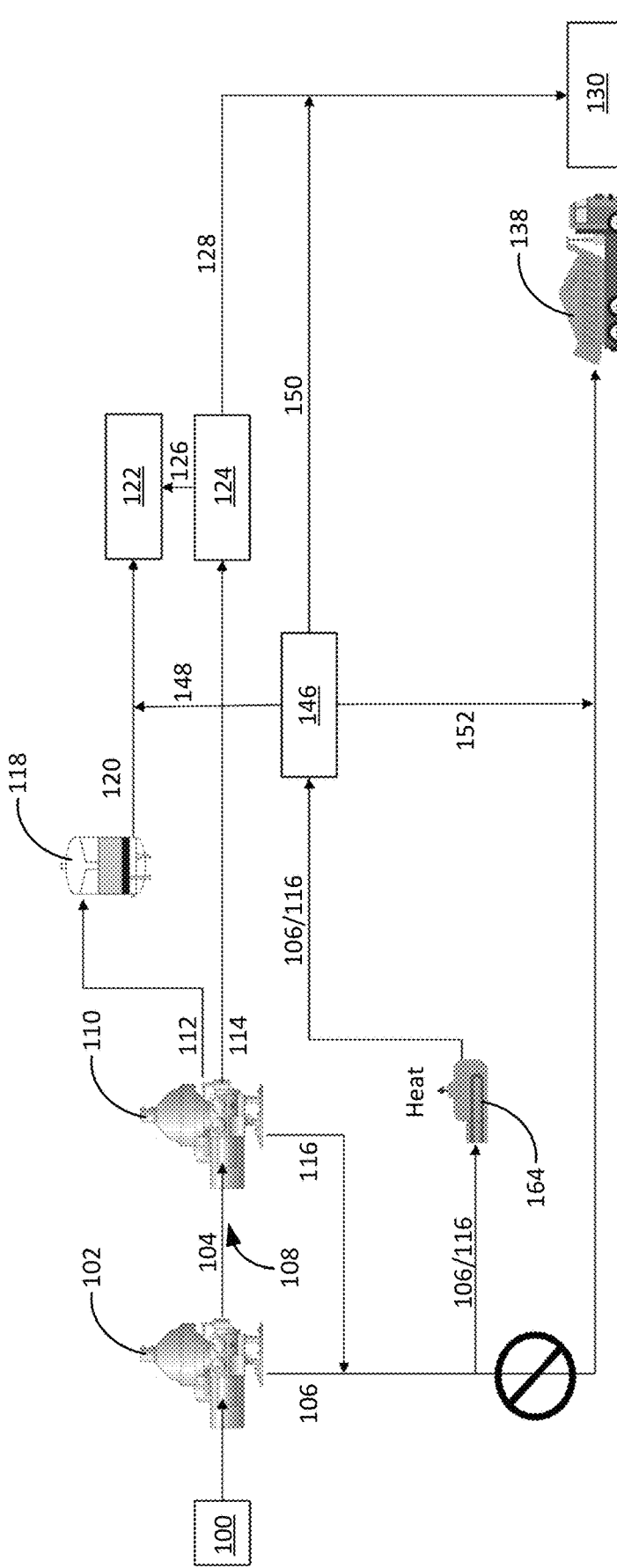
FIG. 5 is a schematic illustration of a method and system with a three-phase centrifuge in accordance with an illustrative embodiment of the present disclosure.

In other embodiments, the enhanced separator is a three-phase centrifuge 146. As depicted in FIG. 5, the sludge streams 106, 116 are conveyed to the three-phase centrifuge 146, where the sludge streams 106, 116 are separated into centrifuged oil 148, centrifuged water 150, and centrifuged sludge 152. The centrifuged oil 148 is retrieved and recycled by being sent to the downstream biorefining unit 122. In one non-limiting embodiment, about 10 vol. % of oil in the sludge streams 106, 116 is recovered by the three-phase centrifuge 146 for recycling. The centrifuged water 150 is sent to the wastewater treatment plant 130, and the centrifuged sludge 152 is disposed of at the landfill 138.

Figure 6:
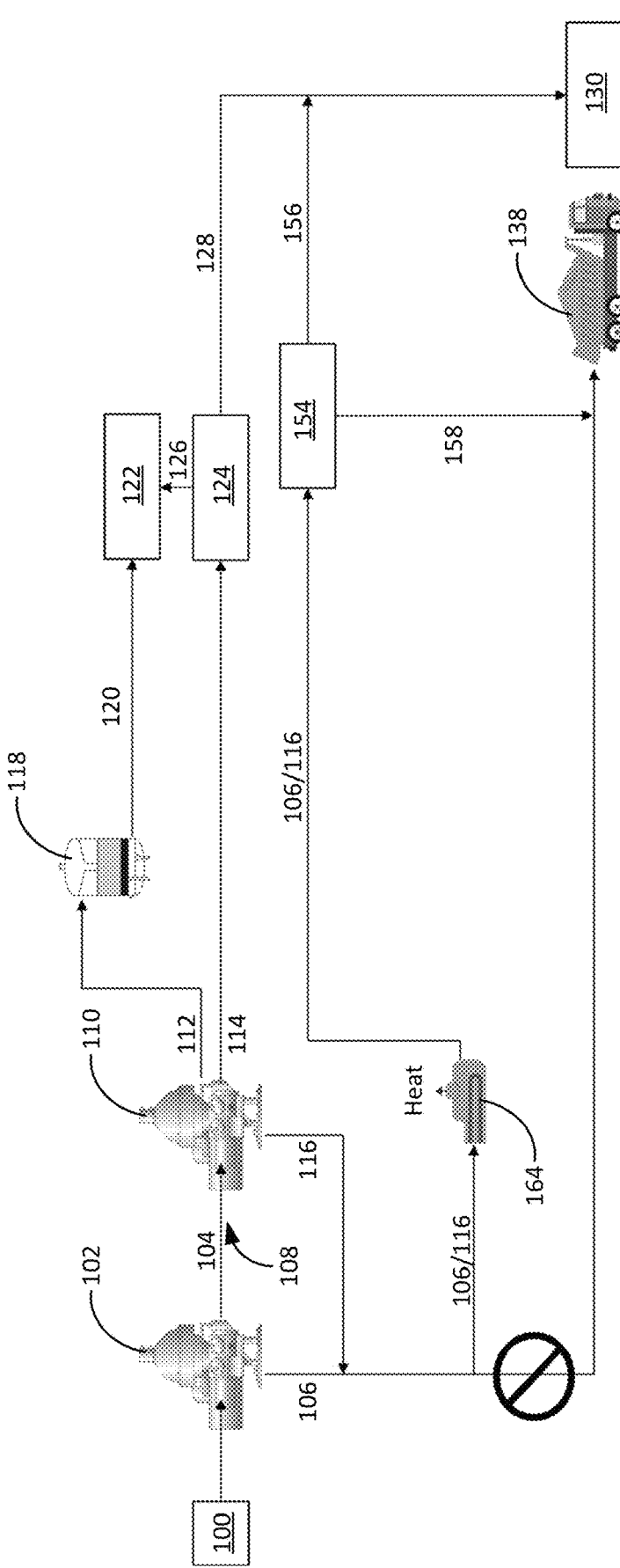
FIG. 6 is a schematic illustration of a method and system with a two-phase centrifuge in accordance with an illustrative embodiment of the present disclosure.

FIG. 6 depicts another embodiment, in which the enhanced separator is a two-phase centrifuge 154. In this embodiment, the sludge streams 106, 116 are conveyed to the two-phase centrifuge 154, and the two-phase centrifuge 154 separates the sludge streams 106, 116 into centrifuged wastewater 156, which is sent to the wastewater treatment plant 130, and centrifuged waste 158, which is sent to the landfill 138 for disposal.

Figure 7:
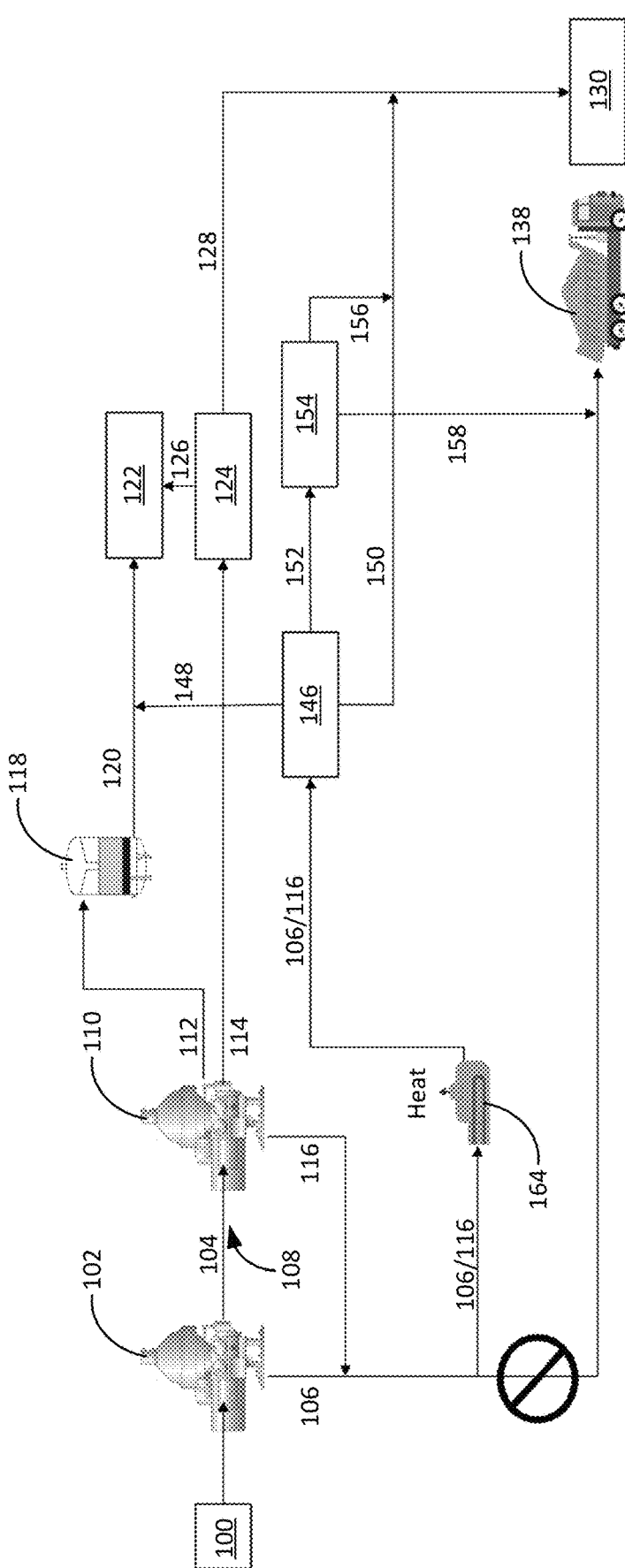
FIG. 7 is a schematic illustration of a method and system with a three-phase centrifuge and a two-phase centrifuge in accordance with an illustrative embodiment of the present disclosure.

FIG. 7 depicts yet another embodiment, in which the three-phase centrifuge 146 and the two-phase centrifuge 154 are used in sequence. The three-phase centrifuge 146 separates the sludge streams 106, 116 into centrifuged oil 148, centrifuged water 150, and centrifuged sludge 152. The centrifuged oil 148 is sent to the downstream biorefining unit 122, the centrifuged water 150 is sent to the wastewater treatment plant 130, and the centrifuged sludge 152 is conveyed to the two-phase centrifuge 154. At the two-phase centrifuge 154, the centrifuged sludge 152 is further separated into the centrifuged wastewater 156 and the centrifuged waste 158. The centrifuged wastewater 156 is conveyed to the wastewater treatment plant 130, and the centrifuged waste 158 is disposed of at the landfill 138.

Dewatering aids may be added to assist in the separation process(es) of the three-phase centrifuge 146, the two-phase centrifuge 154, or both. In one embodiment, a dewatering aid is introduced to the portion 160 of the sludge streams 106, 116 before the sludge streams 106/116 are conveyed to the three-phase centrifuge 146. In another embodiment, the dewatering aid is introduced to the sludge streams 106, 116 or the centrifuged sludge 152 before it enters the two-phase centrifuge 154. In yet another embodiment, one treatment of the dewatering aid is introduced before the sludge streams 106, 116 enter the three-phase centrifuge 146, and an additional treatment of the dewatering aid is introduced before the resulting centrifuged sludge 152 is conveyed to the two-phase centrifuge 154. Suitable dewatering aids include, but are not necessarily limited to, surface wetting agent surfactants such as amine oxyalkylates, polyols containing polymers of ethylene oxide and/or propylene oxide, sulfonates, and sulfosuccinates.

Figure 8:
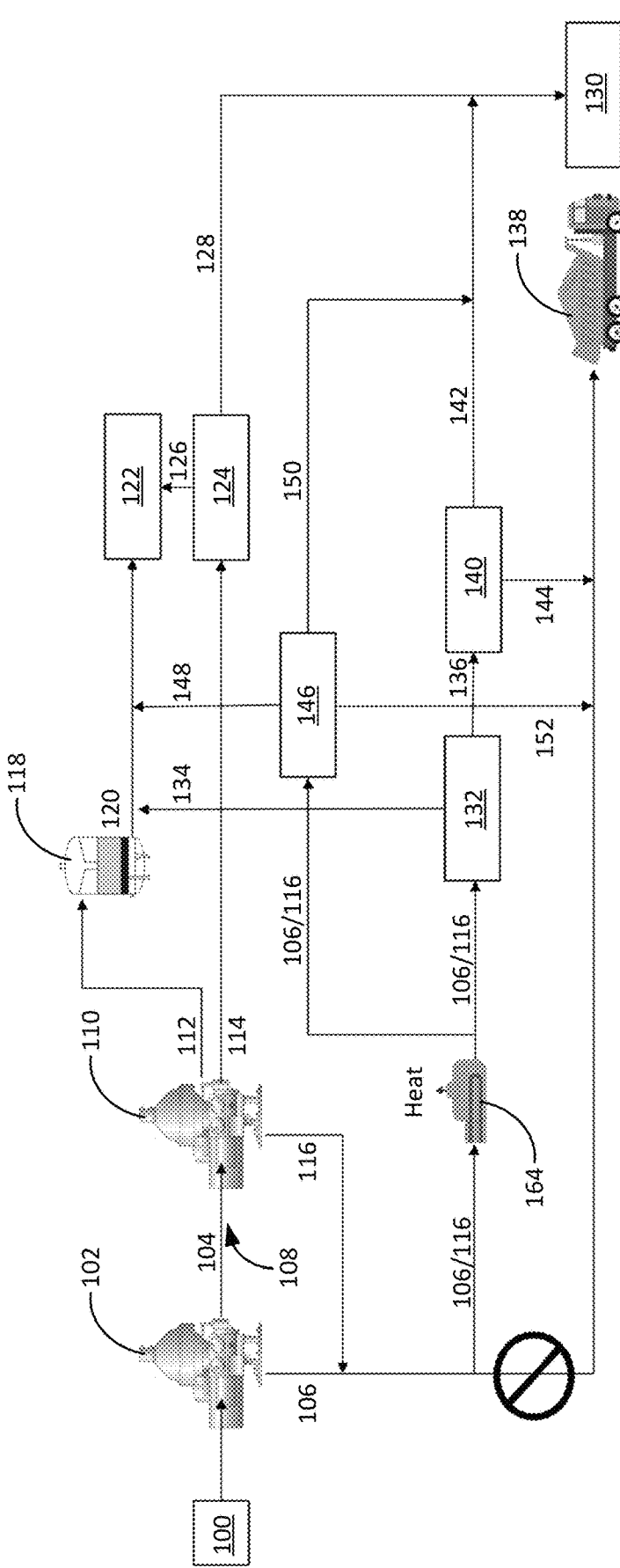
FIG. 8 is a schematic illustration of a method and system with a gravity separator, a flotation system, and a three-phase centrifuge in accordance with an illustrative embodiment of the present disclosure.

FIG. 8 depicts an exemplary embodiment of the innovative methods and systems, where the gravity separator 132, the flotation system 140, and the three-phase centrifuge 146 are used in combination to minimize sludge and improve the quality of the biorefinery-produced materials. A portion 160 of the primary sludge stream 106 and the second sludge stream 116 is conveyed to the three-phase centrifuge 146, while a remainder 162 of the sludge streams 106, 116 is conveyed to the gravity separator 132.

Figure 9:
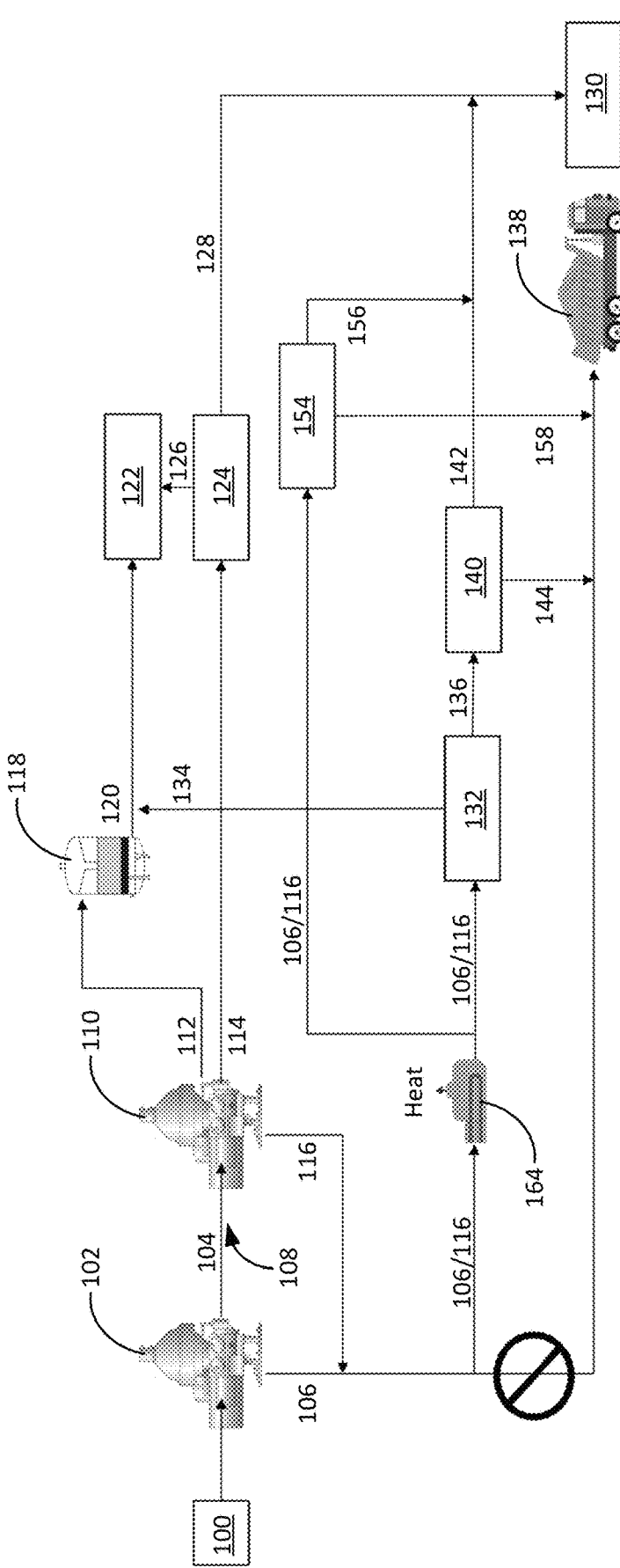
FIG. 9 is a schematic illustration of a method and system with a gravity separator, a flotation system, and a two-phase centrifuge in accordance with an illustrative embodiment of the present disclosure.

FIG. 9 depicts another exemplary embodiment of the innovative methods and systems, where the gravity separator 132, the flotation system 140, and the two-phase centrifuge 154 are used in combination. The portion 160 of the primary sludge stream 106 and the second sludge stream 116 is conveyed to the two-phase centrifuge 154, while the remainder 162 of the sludge streams 106, 116 is conveyed to the gravity separator 132.

Figure 10:
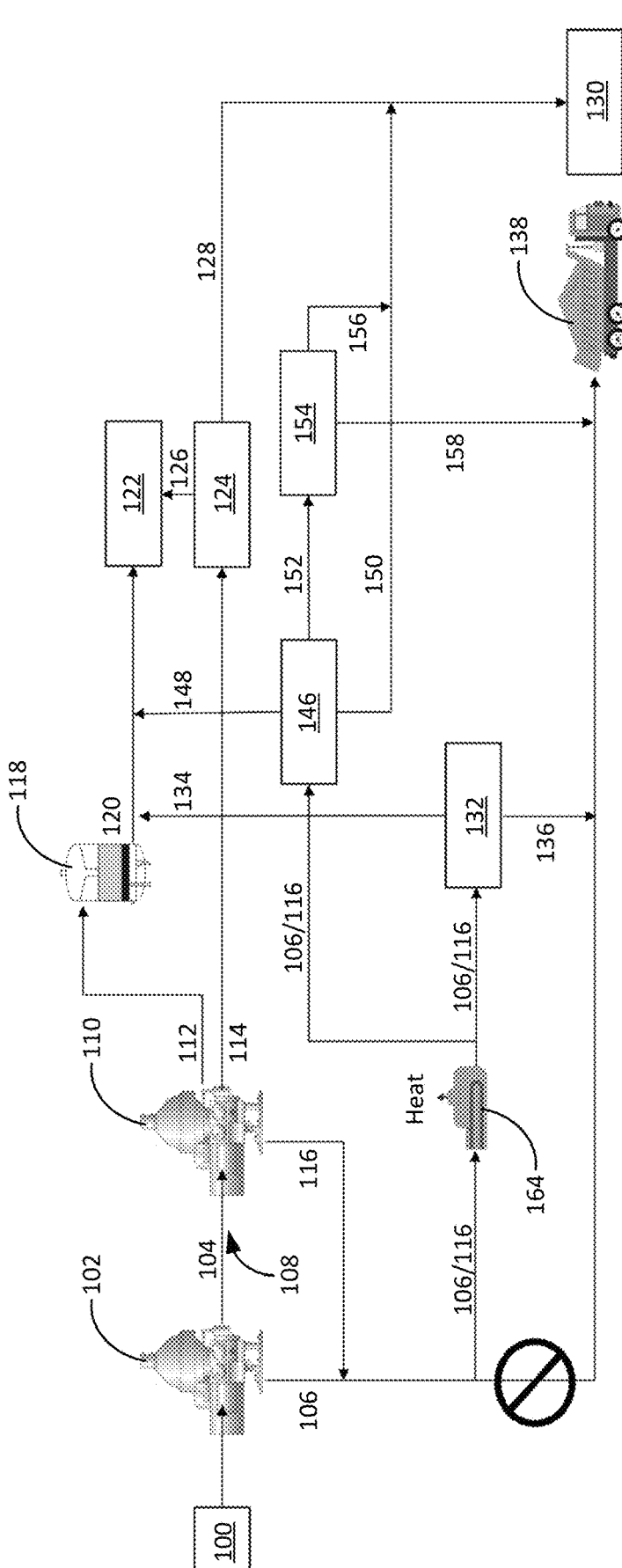
FIG. 10 is a schematic illustration of a method and system with a gravity separator, a three-phase centrifuge, and a two-phase centrifuge in accordance with an illustrative embodiment of the present disclosure.

In FIG. 10, yet another exemplary embodiment of the innovative methods and systems is depicted, in which the gravity separator 132, the three-phase centrifuge 146, and the two-phase centrifuge 154 are used in combination. The portion 160 of the primary sludge stream 106 and the second sludge stream 116 is conveyed to the three-phase centrifuge 146, while the remainder 162 of the sludge streams 106, 116 is conveyed to the gravity separator 132.

Figure 11:
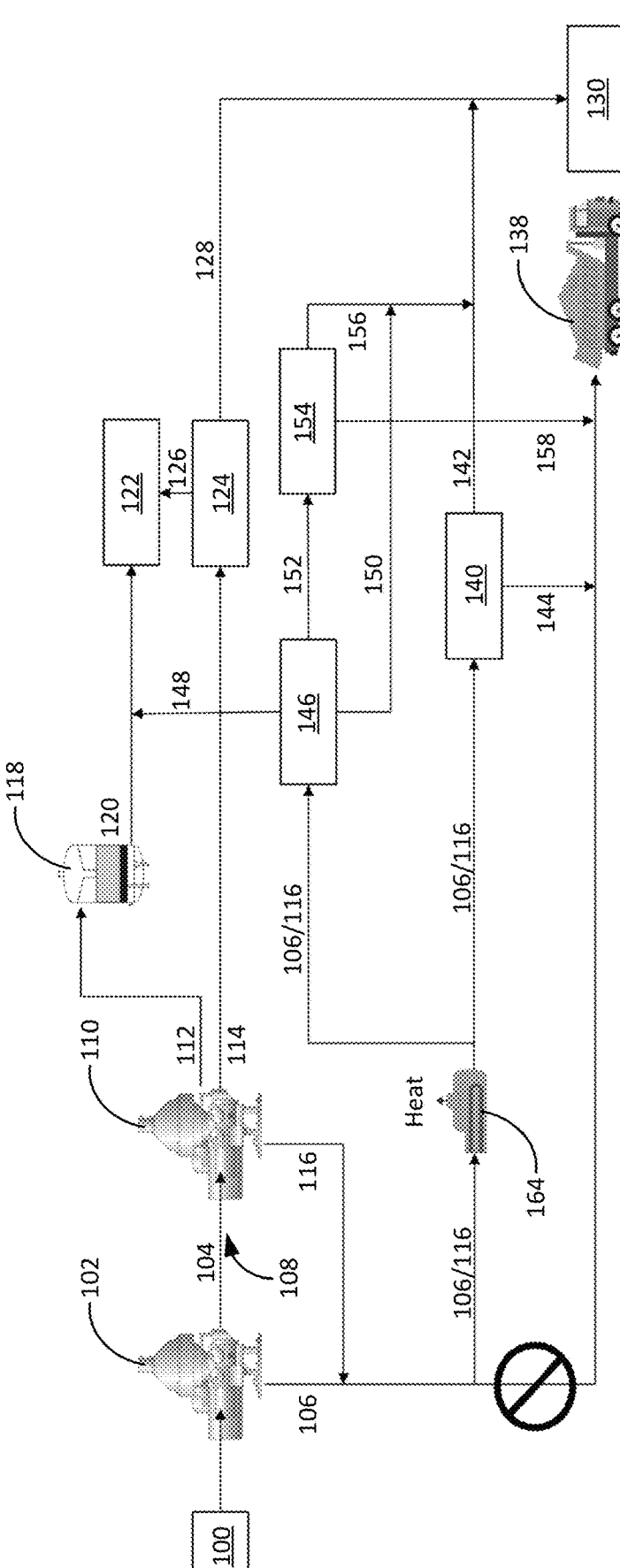
FIG. 11 is a schematic illustration of a method and system with a flotation system, a three-phase centrifuge, and a two-phase centrifuge in accordance with an illustrative embodiment of the present disclosure.

FIG. 11 depicts yet another exemplary embodiment of the innovative methods and systems. In this embodiment, the flotation system 140, the three-phase centrifuge 146, and the two-phase centrifuge 154 are used in combination. The portion 160 of the primary sludge stream 106 and the second sludge stream 116 is conveyed to the three-phase centrifuge 146, while the remainder 162 of the sludge streams 106, 116 is conveyed to the flotation system 140.

Figure 12:
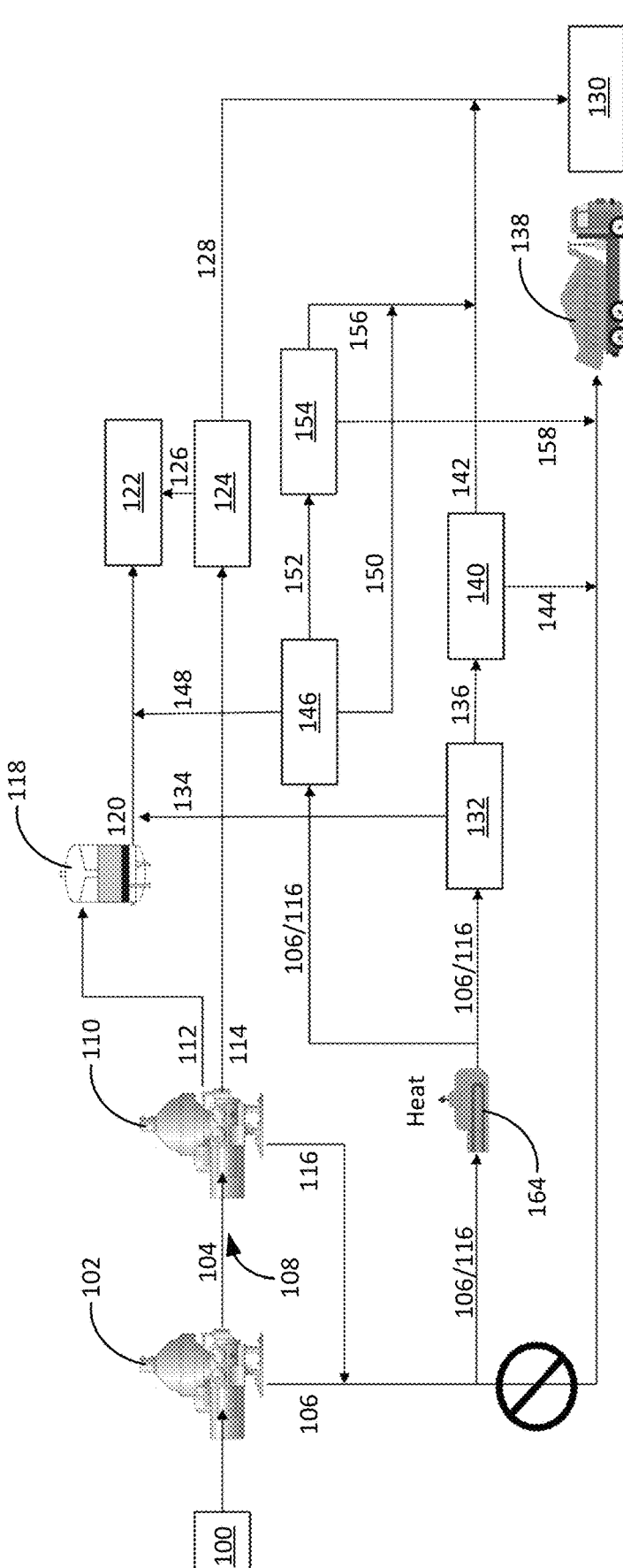
FIG. 12 is a schematic illustration of a method and system with a gravity separator, a flotation system, a three-phase centrifuge, and a two-phase centrifuge in accordance with an illustrative embodiment of the present disclosure.

Turning now to FIG. 12, another exemplary embodiment of the innovative methods and systems uses the gravity separator 132, the flotation system 140, the three-phase centrifuge 146, and the two-phase centrifuge 154 in combination. The portion 160 of the primary sludge stream 106 and the second sludge stream 116 is conveyed to the three-phase centrifuge 146, while the remainder 162 of the sludge streams 106, 116 is conveyed to the gravity separator 132.

In various non-limiting embodiments, the sludge streams 106, 116 are heated by a heater 164 before being conveyed to the gravity separator 132, the flotation system 140, the three-phase centrifuge 146, and/or the two-phase centrifuge 154.

A demulsifier may be introduced at one or more points in the innovative methods and systems to reduce emulsion stability and enhance the separation of oil and water. In various embodiments, the demulsifier is introduced to the source feedstock 100 before it enters the degumming centrifuge 102, to the sludge streams 106, 116 before entering the heater 164 or the gravity separator 132, or to both the source feedstock 100 and the sludge streams 106, 116.

Suitable demulsifiers include, but are not necessarily limited to, phenolic resins, resin alkoxylates, polyols, sulfonates, amine/polyamine oxyalkylates, and combinations thereof. Non-limiting examples of the demulsifier in various embodiments include oxyalkylated phenolic resins, oxyalkylated amines, and dodecyl benzene sulfonic acid (DDBSA). The amount of the demulsifier added ranges from about 10 independently to about 1,000 ppm based on the point of introduction (e.g., the source feedstock 100, the sludge streams 106, 116); alternatively, from about 100 independently to about 500 ppm. In one non-limiting embodiment, the amount of demulsifier is 1,000 ppm based on the point of introduction.

Metal chelation aids may be introduced at one or more points in the innovative methods and systems to help reduce levels of contaminants, e.g., metals, in oil. The metal chelation aids can, for example, reduce contaminant levels in the oily water 114 that enters the oil/water separator 124, as well as contaminant levels in the emulsion phase. Metals removed by the metal chelation aids may include those of Groups IA, IIA, VB, VIII, IIB and IVA of the Periodic Table (CAS version). In various non-limiting embodiments, the metals include calcium, iron, zinc, silicon, nickel, sodium, potassium, vanadium, mercury, copper, and combinations thereof. Sulfur and phosphorus can also be removed in some embodiments.

In various embodiments, the metal chelation aids are introduced to one or more of the following: to the source feedstock 100 before it enters the degumming centrifuge 102, to the wet oil 104 (e.g., after the hot wash water 108 is introduced therein), and to the primary sludge stream 106 and the second sludge stream 116 (e.g., before the sludge streams 106, 116 are heated in the heater 164). The amount of the metal chelation aid added ranges from about 100 ppm to about 2,000 ppm based on the point of introduction (e.g., the source feedstock 100, the wet oil 104, the sludge streams 106, 116). In one non-limiting embodiment, about 1,000 ppm metal chelation aid is introduced.

Suitable metal chelation aids include, but are not necessarily limited to, water-soluble hydroxyacids selected from the group consisting of glycolic acid, gluconic acid, $C_2$-$C_4$ alpha-hydroxy acids, malic acid, lactic acid, poly-hydroxy carboxylic acids, thioglycolic acid, chloroacetic acid, polymeric forms of the above hydroxyacids, poly-glycolic esters, and glycolate ethers; ammonium salts of these water-soluble hydroxyacids; alkali metal salts of these water-soluble hydroxyacids; and mixtures thereof. Non-limiting embodiments of the metal chelation aid include the EXCALIBUR™ additives and ALCHEMIA™ additives available from Baker Hughes. Suitable metal chelation aids are also disclosed in U.S. Pat. No. 7,497,943 to Baker Hughes Holdings LLC, incorporated herein by reference in its entirety.

Water sent to the wastewater treatment plant 130 (e.g., the wastewater stream 128, the separated water 142, the centrifuged water 150, and the centrifuged wastewater 156) may have high chemical oxygen demand (COD), which makes processing at the wastewater treatment plant 130 more difficult. To address this issue, an additive to reduce the COD can be added to the water before it reaches the wastewater treatment plant 130. The additive may include one or more oxidizers. In various non-limiting embodiments, suitable oxidizers include air, oxygen, hydrogen peroxide, potassium permanganate ($KMnO_4$), hypochlorides, chlorine dioxide, and sodium hypochlorite (NaOCl bleach). The amount of oxidizer added ranges from about 100 to about 10,000 ppm based on the water. The COD of the water may also be reduced by treatment and/or filtering with activated carbon or other adsorbents. In one embodiment, water is filtered through an activated carbon bed before entering the wastewater treatment plant 130. In another embodiment, nanobubbles may be used to reduce the COD.

Organics may also be extracted from the water sent to the wastewater treatment plant 130 to reduce the COD. In various embodiments, an extraction solvent is added to the wastewater stream 128, the separated water 142, the centrifuged water 150, the centrifuged wastewater 156, or combinations thereof. The extraction solvent may include organic carbonates, aliphatic hydrocarbons, and aromatic hydrocarbons. Suitable organic carbonates include, but are not necessarily limited to, ethylene carbonate, propylene carbonate, glycerol carbonate, and styrene carbonate. A non-limiting list of suitable aliphatic and aromatic hydrocarbons includes xylene, kerosene, diesel fuel, polypropylene glycols, and polypropylene ethers. Where the extraction solvent includes an organic carbonate, the extraction solvent may also include an additional chemical selected from the group consisting of amines, imines, chelants, polyalkylene-polyamines, polymers with ammonia, 1,2-dichloroethane, tetraethylenepentamine, polyethyleneimine branched, amino alkylphenolic resins, ethylene diamine, and combinations thereof. In various non-limiting embodiments, the ratio of extraction solvent to the wastewater stream 128 ranges from about 10/90 independently to about 80/20; alternatively, from about 30/70 independently to about 70/30. The extraction solvent can be regenerated or reused by filtration through activated carbon or by contact with silica gel, alumina, molecular sieves, or other adsorbents.

Example I

Figure 14:
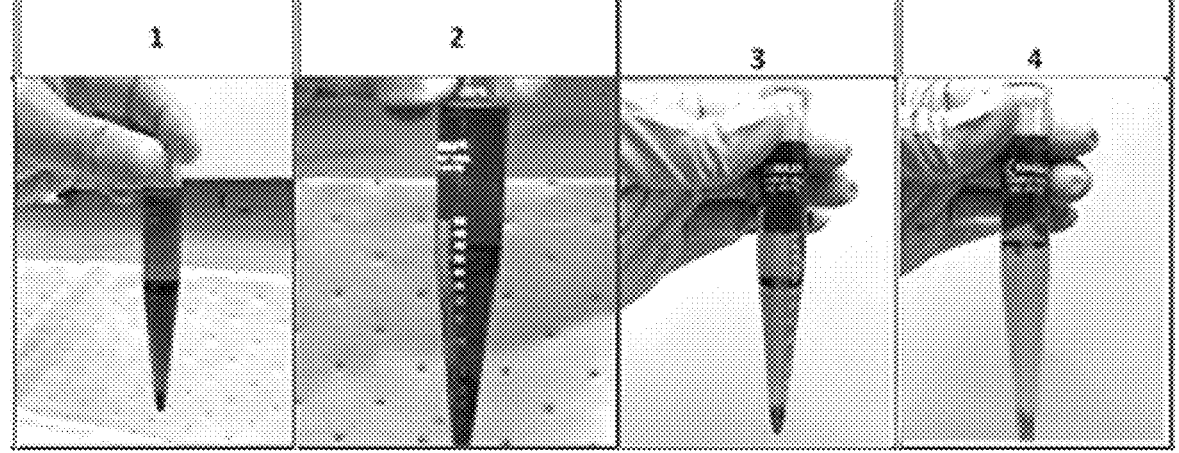
FIG. 14 depicts a variety of oil/water/emulsion/sludge combinations after centrifugation without any chemical treatment.
Figure 14:
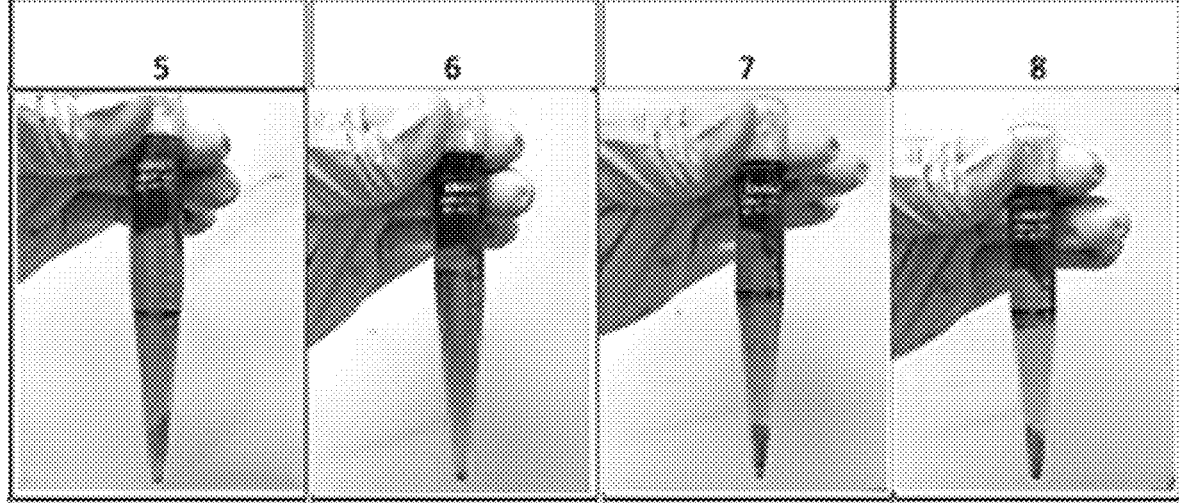

FIG. 14 depicts a variety of oil/water/emulsion/sludge samples after centrifugation without any chemical treatment. Table I demonstrates the potential water recovery and oil recovery for each of these sludge samples.

TABLE I

| Oil, Water, Emulsion, and Sludge Separation of Semi-solid Sludge by Centrifugation | | | | | | | | |
|---|---|---|---|---|---|---|---|---|
| Sample No. | 1 | 2 | 3 | 4 | 5 | 6 | 7 | 8 |
| Oil content vol. % | 30 | 20 | 35 | 3 | 46 | 9 | 26 | 28 |
| Water vol. % | 57 | 60 | 56 | 90 | 42 | 82 | 60 | 58 |
| Emulsion vol. % | 10 | 10 | 6 | 4 | 6 | 8 | 10 | 8 |
| Sludge vol. % | 3 | 10 | 3 | 3 | 6 | 1 | 4 | 6 |

From Table I, the average amount of oil was 25 vol. %, i.e., potentially 25 vol. % oil could be extracted from these sludge samples.

The average amount of water was 63.1 vol. %, i.e., potentially 63.1 vol. % water could be sent to a wastewater treatment plant.

The average amount of sludge was 4.5 vol. %, i.e., potentially only 4.5 vol. % of total sludge could be sent to a landfill.

If these samples had been treated with a demulsifier, it is expected that the emulsion (rag) layer would have been reduced. Use of a metal chelation aid would have likely improved water quality.

Example II

Figure 15:
FIG. 15 depicts the results of treatment of a sludge with a demulsifier.
Figure 15:
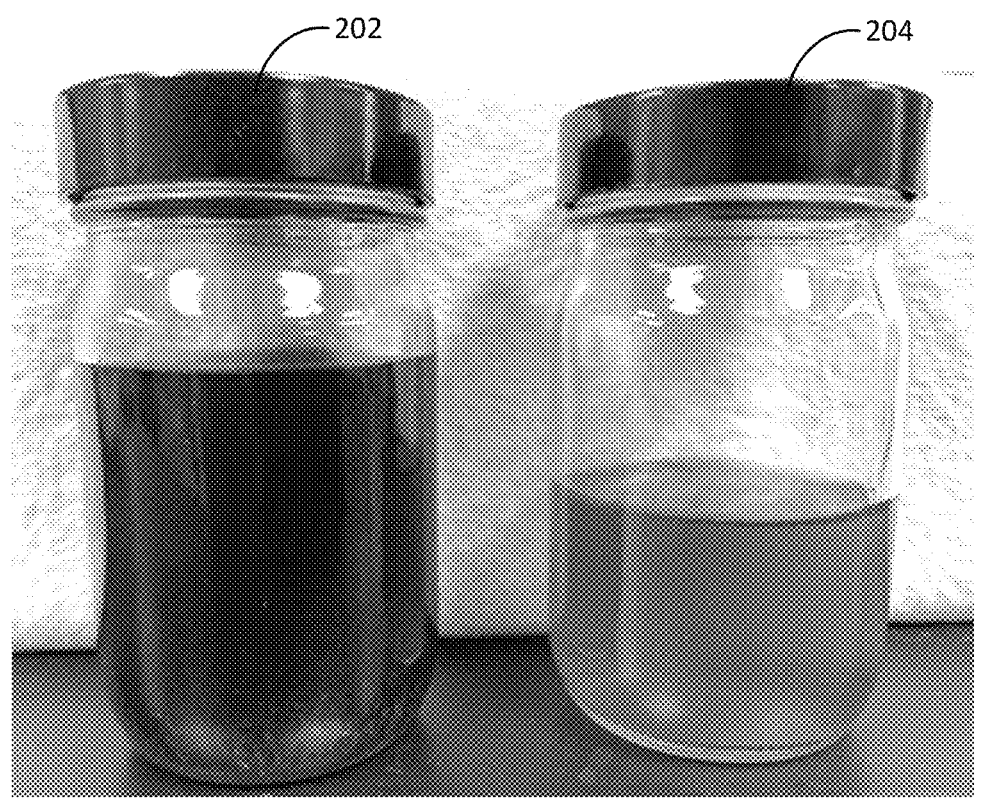

FIG. 15 includes two photographs that depict the results of treatment of a sludge with 100 ppm demulsifier after centrifuging the sludge. Tube 200 shows an oil layer over a water layer after addition of the demulsifier to the sludge. Jar 202 shows the same oil layer and jar 204 shows the same water layer separated from one another after centrifugation.

Example III

Figure 16:
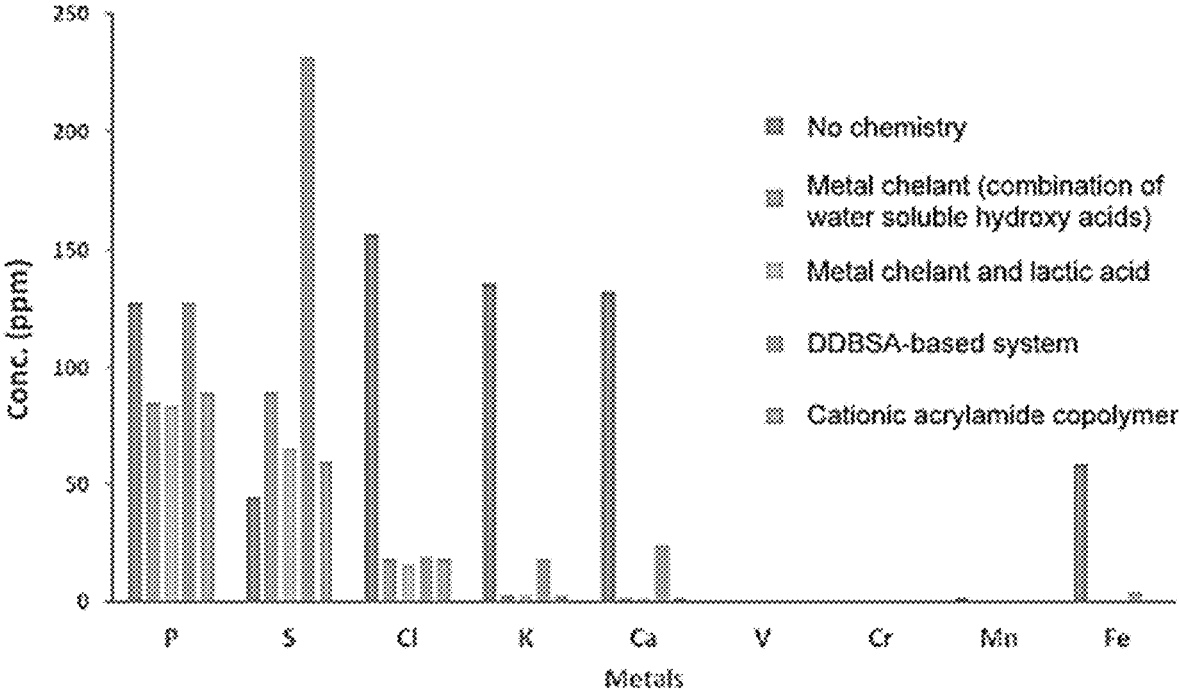
FIG. 16 depicts the results of treatment of oil with various metal chelation aids.

FIG. 16 is a chart presenting the metal, phosphorus, and sulfur contents on an oil sample after treatment with metal chelation aids. The first bar shows the results with no chemical treatment. The next four bars show the results after treatment with 1,000 ppm of the indicated metal chelation aid. For phosphorus, metal content decreased after the addition of each metal chelation aid, except for the metal chelant with lactic acid. Each of the tested metal chelation aids increased the amount of sulfur in the oils. There were no appreciable amounts of vanadium, chromium, or manganese in this particular oil sample.

Example IV

Figure 17:
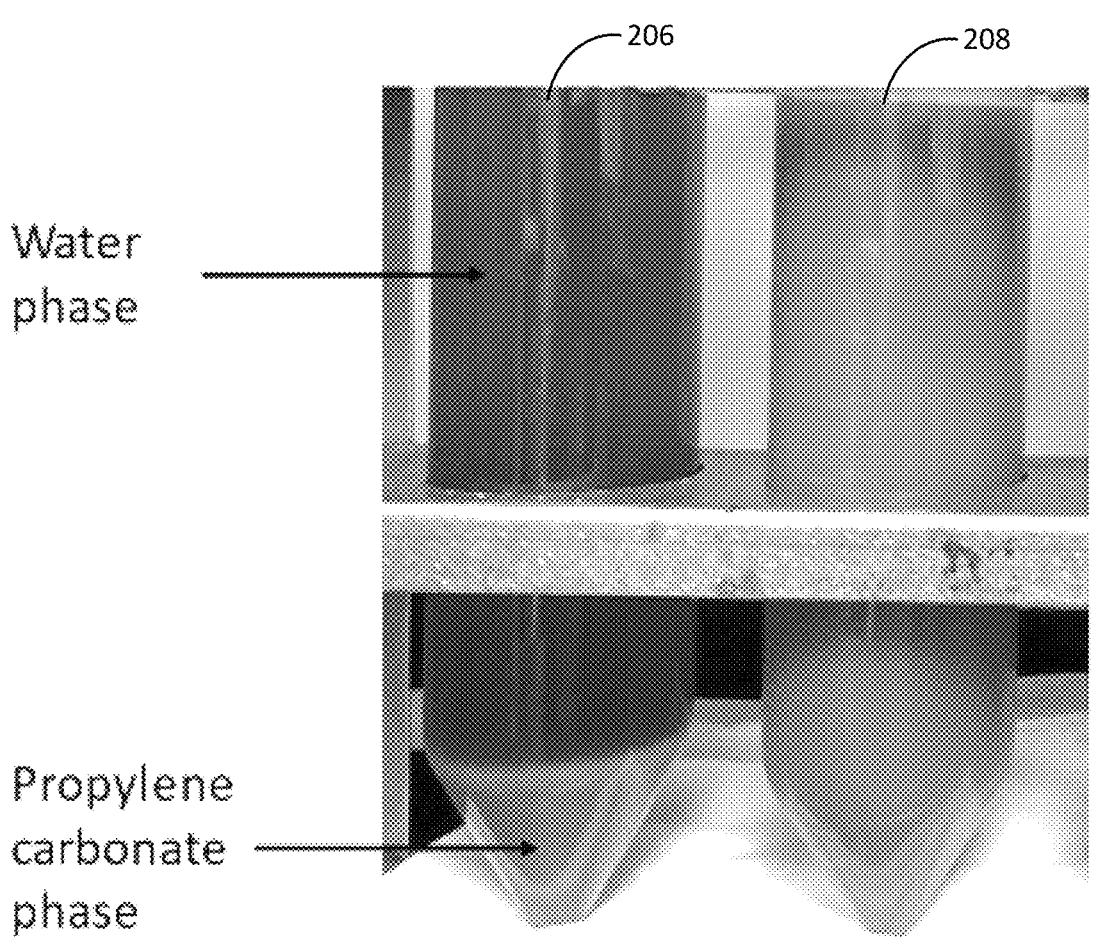
FIG. 17 depicts two vials of water separated from an emulsion, where one vial is treated with an extraction solvent and the other vial is left untreated.

FIG. 17 depicts two vials of water separated from an emulsion, where one vial is treated with an extraction solvent. In treated vial 206, 90 mL of water was treated with 10 mL of propylene carbonate and shaken. Untreated vial 208 received no extraction solvent. The material in the untreated vial 208 did not separate and appears homogeneous, while the treated vial 206 showed a distinct separation of the water phase from the propylene carbonate phase.

The improved methods and systems described herein utilize a combination of mechanical and chemical processes to achieve reduced sludge volumes and improve oil quality and water quality. The improved methods and systems can be applied to processing a variety of oils including, but not necessarily limited to, soybean oil, canola oil, corn oil, palm oil, animal fat, waste cooking oils, and various combinations of these. In one non-limiting embodiment, the source feedstock 100 includes about 32 vol. % used cooking oils, about 32 vol. % animal fat (tallows), about 32 vol. % corn oil, and about 3 vol. % soybean oil. Using traditional sludge processing methods, source streams having up to 5 vol. % soybean oil would give a tight emulsion which is difficult to resolve.

In the foregoing specification, the invention has been described with reference to specific embodiments thereof. However, it will be evident that various modifications and changes can be made thereto without departing from the broader scope of the invention as set forth in the appended claims. Accordingly, the specification is to be regarded in an illustrative rather than a restrictive sense. For example, different centrifuges tanks, ecofiners, separators, decanters, filters, hydrocyclones, interceptors, demulsifiers, sludges, oils, metal chelation aids, extraction solvents, proportions, amounts, process conditions, and steps not specifically identified or described in this disclosure or not evaluated in a particular Example are still expected to be within the scope of this invention.

The present invention may suitably comprise, consist of, or consist essentially of the elements disclosed and may be practiced in the absence of an element not disclosed.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

It is claimed:

1. A method for minimizing sludge from a biorefinery, the method comprising the steps of:

feeding a source feedstock into a degumming centrifuge, wherein the source feedstock is separated into wet oil and a primary sludge stream;

conveying the primary sludge stream to a gravity separator, wherein the primary sludge stream is separated into recovered oil and residual sludge;

retrieving the recovered oil;

conveying the residual sludge to a flotation system, wherein the residual sludge is separated into separated water and a waste product;

conveying the separated water to a wastewater treatment plant; and disposing of the waste product.

2. The method of claim 1, wherein the step of retrieving the recovered oil further comprises conveying the recovered oil to a downstream biorefining unit.

3. The method of claim 1 further comprising the steps of:

conveying the wet oil to a water wash centrifuge, wherein the wet oil is separated into degummed oil, oily water, and a second sludge stream;

joining the second sludge stream with the primary sludge stream.

4. The method of claim 1 further comprising the step of heating the primary sludge stream to a temperature ranging from about 100° F. to about 212° F.

5. The method of claim 1 further comprising the steps of:
introducing a dewatering aid; and
conveying a portion of the primary sludge stream to a three-phase centrifuge.

6. The method of claim 1 further comprising the steps of:
introducing a dewatering aid; and
conveying a portion of the primary sludge stream to a two-phase centrifuge.

7. The method of claim 1 further comprising the steps of:
conveying a portion of the primary sludge stream to a three-phase centrifuge, wherein the portion of the primary sludge stream is separated into centrifuged oil, centrifuged water, and centrifuged sludge;
retrieving the centrifuged oil; and
conveying the centrifuged water to the wastewater treatment plant.

8. The method of claim 7 further comprising the steps of:
conveying the centrifuged sludge to a two-phase centrifuge, wherein the centrifuged sludge is separated into centrifuged wastewater and waste centrifuged waste;
conveying the centrifuged wastewater to the wastewater treatment plant; and
disposing of the centrifuged waste.

9. The method of claim 7 further comprising the step of disposing of the centrifuged sludge.

10. The method of claim 1 further comprising the step of introducing a demulsifier to the source feedstock.

11. The method of claim 1 further comprising the step of introducing a metal chelation aid to the source feedstock, the wet oil, or the primary sludge stream and the secondary sludge stream.

12. The method of claim 11, wherein the metal chelation aid is selected from the group consisting of:
water-soluble hydroxyacids selected from the group consisting of glycolic acid, gluconic acid, C2-C4 alpha-hydroxy acids, malic acid, lactic acid, poly-hydroxy carboxylic acids, thioglycolic acid, chloroacetic acid, polymeric forms of the above hydroxyacids, poly-glycolic esters, and glycolate ethers;
ammonium salts of the water-soluble hydroxyacids;
alkali metal salts of the water-soluble hydroxyacids; and
mixtures thereof.

13. The method of claim 1 further comprising the step of treating the separated water with an additive to reduce chemical oxygen demand, wherein the additive is an oxidizer selected from the group consisting of air, oxygen, hydrogen peroxide, potassium permanganate ($KMnO_4$), hypochlorides, chlorine dioxide, sodium hypochlorite ($NaOCl$ bleach), and combinations thereof.

14. The method of claim 1 further comprising the step of treating the separated water with an extraction solvent selected from the group consisting of:
organic carbonates selected from the group consisting of ethylene carbonate, propylene carbonate, glycerol carbonate, and styrene carbonate;
aliphatic and aromatic hydrocarbons selected from the group consisting of xylene, kerosene, diesel fuel, polypropylene glycols, polypropylene ethers; and
combinations thereof.

15. A method for minimizing sludge from a biorefinery, the method comprising the steps of:
feeding a source feedstock into a degumming centrifuge, wherein the source feedstock is separated into wet oil and a primary sludge stream;
conveying a portion of the primary sludge stream to a three-phase centrifuge, wherein the portion of the primary sludge stream is separated into centrifuged oil, centrifuged water, and centrifuged sludge;
retrieving the centrifuged oil;
conveying the centrifuged water to a wastewater treatment plant;
conveying a remainder of the primary sludge stream to a gravity separator, wherein the remainder of the primary sludge stream is separated into recovered oil and residual sludge; and
retrieving the recovered oil.

16. The method of claim 15 further comprising the steps of:
conveying the centrifuged sludge to a two-phase centrifuge, wherein the centrifuged sludge is separated into centrifuged wastewater and waste centrifuged waste;
conveying the centrifuged wastewater to the wastewater treatment plant; and
disposing of the centrifuged waste.

17. The method of claim 15 further comprising the steps of disposing of the residual sludge.

18. The method of claim 15 further comprising the step of introducing a dewatering aid, a demulsifier, a metal chelation aid, an additive to reduce chemical oxygen demand, or an extraction solvent.

19. A method for minimizing sludge from a biorefinery, the method comprising the steps of:
feeding a source feedstock into a degumming centrifuge, wherein the source feedstock is separated into wet oil and a primary sludge stream;
heating the primary sludge stream to a temperature ranging from about 100° F. to about 212° F.;
conveying the primary sludge stream to a three-phase centrifuge, wherein the primary sludge stream is separated into centrifuged oil, centrifuged water, and centrifuged sludge;
retrieving the centrifuged oil;
conveying the centrifuged water to the wastewater treatment plant;
conveying the centrifuged sludge to a two-phase centrifuge, wherein the centrifuged sludge is separated into centrifuged wastewater and waste centrifuged waste;
conveying the centrifuged wastewater to the wastewater treatment plant; and
disposing of the centrifuged waste.

20. The method of claim 19 further comprising the step of introducing a dewatering aid, a demulsifier, a metal chelation aid, an additive to reduce chemical oxygen demand, or an extraction solvent.

* * * * *